(12) United States Patent
Remberg Bueno et al.

(10) Patent No.: US 11,014,495 B2
(45) Date of Patent: May 25, 2021

(54) SYSTEM FOR ISSUING A WARNING AGAINST IMPACT IN A VEHICLE WHEN PARKED

(71) Applicant: Ernst Albert Remberg Bueno, Estado de México (MX)

(72) Inventors: Ernst Albert Remberg Bueno, Estado de México (MX); Herman Diaz Arias, Estado de México (MX)

(73) Assignee: Ernst Albert Remberg Bueno, Estado de México (MX)

( * ) Notice: Subject to any disclaimer, the term of this patent is extended or adjusted under 35 U.S.C. 154(b) by 0 days.

(21) Appl. No.: 16/087,429

(22) PCT Filed: Mar. 14, 2017

(86) PCT No.: PCT/MX2017/000032
§ 371 (c)(1),
(2) Date: Sep. 21, 2018

(87) PCT Pub. No.: WO2017/164725
PCT Pub. Date: Sep. 28, 2017

(65) Prior Publication Data
US 2019/0111835 A1    Apr. 18, 2019

(30) Foreign Application Priority Data
Mar. 23, 2016    (MX) .................... MX/a/2016/003807

(51) Int. Cl.
*B60Q 1/48*       (2006.01)
*G08G 1/017*      (2006.01)
(Continued)

(52) U.S. Cl.
CPC .............. *B60Q 1/525* (2013.01); *B60Q 1/48* (2013.01); *G06K 9/00825* (2013.01); *G06K 9/3258* (2013.01); *G08G 1/017* (2013.01)

(58) Field of Classification Search
None
See application file for complete search history.

(56) References Cited

U.S. PATENT DOCUMENTS

| | | | |
|---|---|---|---|
| 2006/0187009 A1* | 8/2006 | Kropinski | G01S 15/931 340/435 |
| 2012/0041632 A1* | 2/2012 | Garcia Bordes | B60W 30/0953 701/29.1 |

(Continued)

*Primary Examiner* — John F Mortell
(74) *Attorney, Agent, or Firm* — FisherBroyles, LLP

(57) ABSTRACT

The invention relates to a system that provides protection to a vehicle against impacts when the vehicle is parked. The system consists of using the elements with which some vehicles are manufactured to design a system that provides protection to the vehicle when parked. In a first embodiment, the system uses as proximity sensors the ultrasound transducers with which certain vehicles are equipped. Subsequently, by mathematically manipulating this data in the elements designed for this purpose in the central computer, the system calculates the speed and acceleration of vehicles approaching the parked vehicle, issuing a visible and audible alarm to prevent a collision. In a second embodiment, the system uses electronic cameras disposed on the front part and on the rear part of the vehicle so as to record the registration number plates of approaching vehicles and to be able to use the height or vertical dimension of the numbers and letters on the plate as a reference element to calculate the distance between the plate and the camera, using a mathematical relationship between distance and the height of the numbers and letters on the plate, as they appear in the image detector of the camera.

10 Claims, 7 Drawing Sheets

(51) Int. Cl.
  *B60Q 1/52* (2006.01)
  *G06K 9/00* (2006.01)
  *G06K 9/32* (2006.01)

(56) References Cited

U.S. PATENT DOCUMENTS

| | | | | |
|---|---|---|---|---|
| 2015/0145695 | A1* | 5/2015 | Hyde | G08G 1/166 340/905 |
| 2016/0070000 | A1* | 3/2016 | Takasuka | G01S 7/4972 356/5.01 |
| 2017/0162047 | A1* | 6/2017 | Garcia Lopez | G08G 1/16 |
| 2017/0178512 | A1* | 6/2017 | Kannon | G07C 5/08 |

* cited by examiner

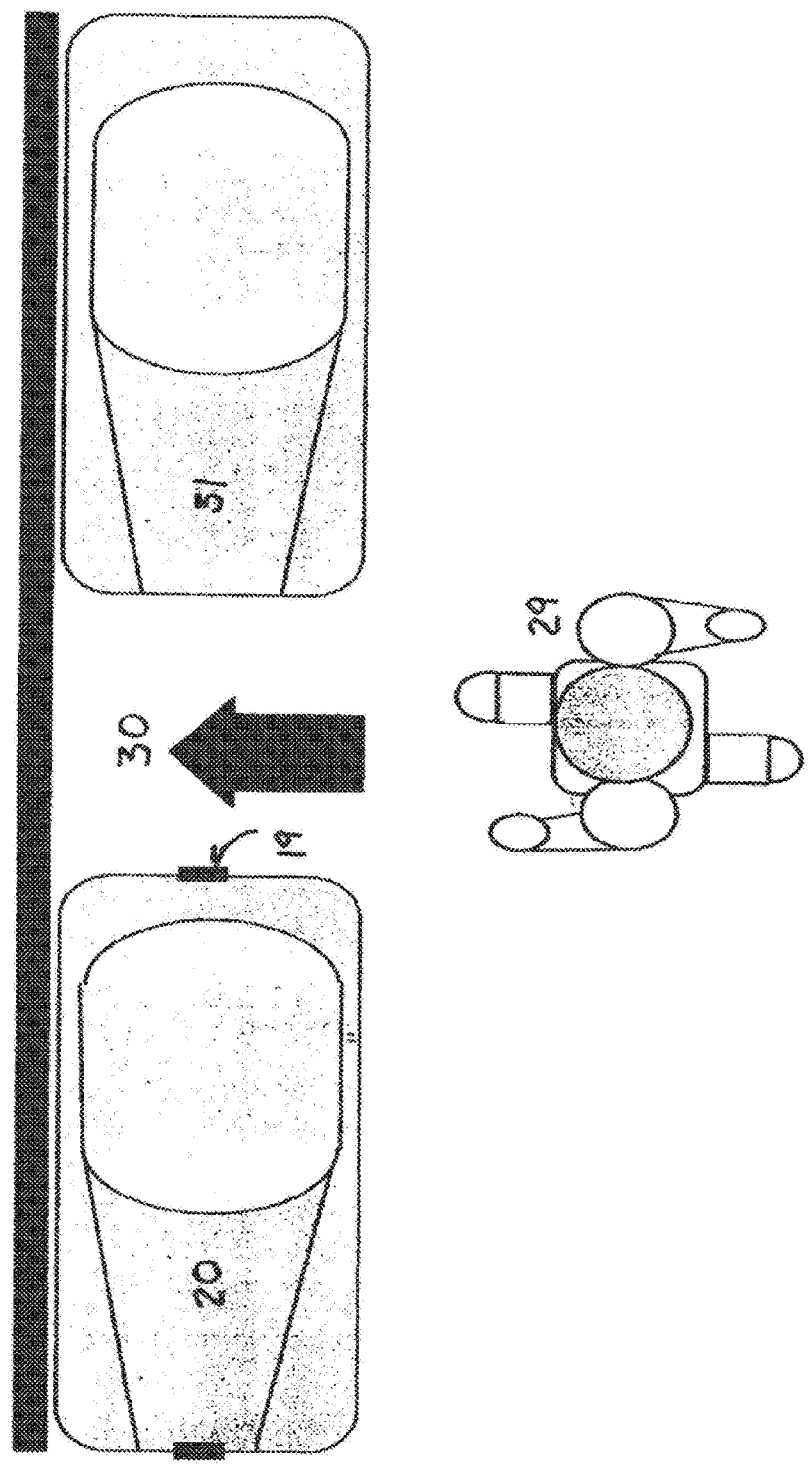

SYSTEM FOR ISSUING A WARNING AGAINST IMPACT IN A VEHICLE WHEN PARKED

PRIORITY APPLICATIONS

This application is a U. S. National Stage Filing under 35 U.S.C. 371 from International Application No. PCT/MX2017/000032, filed on 14 Mar. 2017 and published as WO 2017/164725 on 28 Sep. 2017, which claims the benefit of priority to Mexican Patent Application No. MX/a/2016/003807, filed 23 Mar. 2016, which applications and publication are incorporated herein by referenced in their entirety.

FIELD OF THE INVENTION

The technology, object of the present invention, lies within the field of electronic protection and alarm systems and involves elements directly related to metrology, sensor technology, analogue and digital electronics, and system engineering.

BACKGROUND OF THE INVENTION

Along with the accelerating development of electronics, a large amount of electric, electronic and electromechanical elements for the control and protection of motor vehicles have been incorporated into the same, and currently all manufactured vehicles have a central computer in which each and every operation of the vehicle is concentrated, and as such, the proliferation of these types of electronic elements has allowed vehicle manufacturers to equip vehicles with different alarm systems, especially to prevent theft of the same, however, practically nothing has been done to protect parked vehicles against possible collisions with other vehicles approaching the same, vehicles that are performing parking manoeuvres. Some years ago a patent application was filed by the same author with the aim of providing parked vehicles with this type of protection, however, it was based on the use of external devices on the original vehicle, and as a reference we may cite the application with publication number MX/a/2012/008184.

In fact, up to the present, little, or practically nothing, has been done with respect to this issue and, nevertheless, the damage done to the guards and bumpers of parked automobiles is very common and costly to repair, in addition to the fact that in almost all cases it is impossible to locate the person responsible for the damage, and therefore, the present invention aims to cover all of these shortcomings using already existing elements on the original vehicle.

SUMMARY OF THE INVENTION

The method, object of this invention, consists of utilising the electronic infrastructure with which cutting edge automobiles are equipped, especially those equipped with ultrasonic sensors on the bumper or electronic cameras. The method uses a series of electronic devices virtually created by programming of the central computer of the vehicle which, in the majority of the cases, is able to configure particular active elements such as digital elements and electronic circuits, such as so-called programmable logic elements, and at the same time use analogue electronic elements accessible to the same central computer to assemble amplifiers, detectors, virtual gauges and evaluators which together and by means of the control and organisation of the same central computer are able to provide the vehicle with an alarm that alerts other vehicles when performing these manoeuvres in the proximity of the same, which may be within the conditions of distance, speed and acceleration, such that a collision is imminent and, if necessary, alert the driver of the approaching vehicle by means of the sound of horns and lights of the parked car.

In the case that a vehicle lacks ultrasonic sensors on the front and rear bumpers, we establish a method for using cameras that are placed on the front and rear part of the vehicle one aims to protect and by means of the use of this method these cameras are converted into distance, speed and acceleration sensors; in this case, if the vehicle is already equipped with cameras, the same are used and incorporated into the system.

The use of cameras adds an additional benefit that consists of the possibility of photographing the registration number plate of the impacting vehicle in cases where it is necessary; the photograph of the number plate in question can be subsequently obtained or integrated into the network of the internet of things (IoT) through the central computer.

DESCRIPTION OF THE FIGURES

FIG. 7 shows a pedestrian crossing the area between two parked cars.

DETAILED DESCRIPTION OF THE INVENTION

The method object of the present invention consists of the use of a central computer of the vehicle and different electronic circuits, all original equipment of the vehicle, to create virtual devices based on the use of the programmable logic elements and the use of the circuits of amplification, comparators, attenuators and other analogue elements available in the central computer to create an alarm system that alerts the driver of an approaching vehicle when their manoeuvres of approach constitute a risk of collision with the protected parked vehicle, making horns sound and lights go off on the protected vehicle to prevent the subsequent collision and damage to the parked vehicle. The method makes use of ultrasonic sensors with which some vehicles are equipped on both bumpers, or of electronic cameras, which are either part of the original vehicle or subsequently installed on the same, with the object of determining the speed, distance or acceleration of an approaching vehicle.

Figure 1:
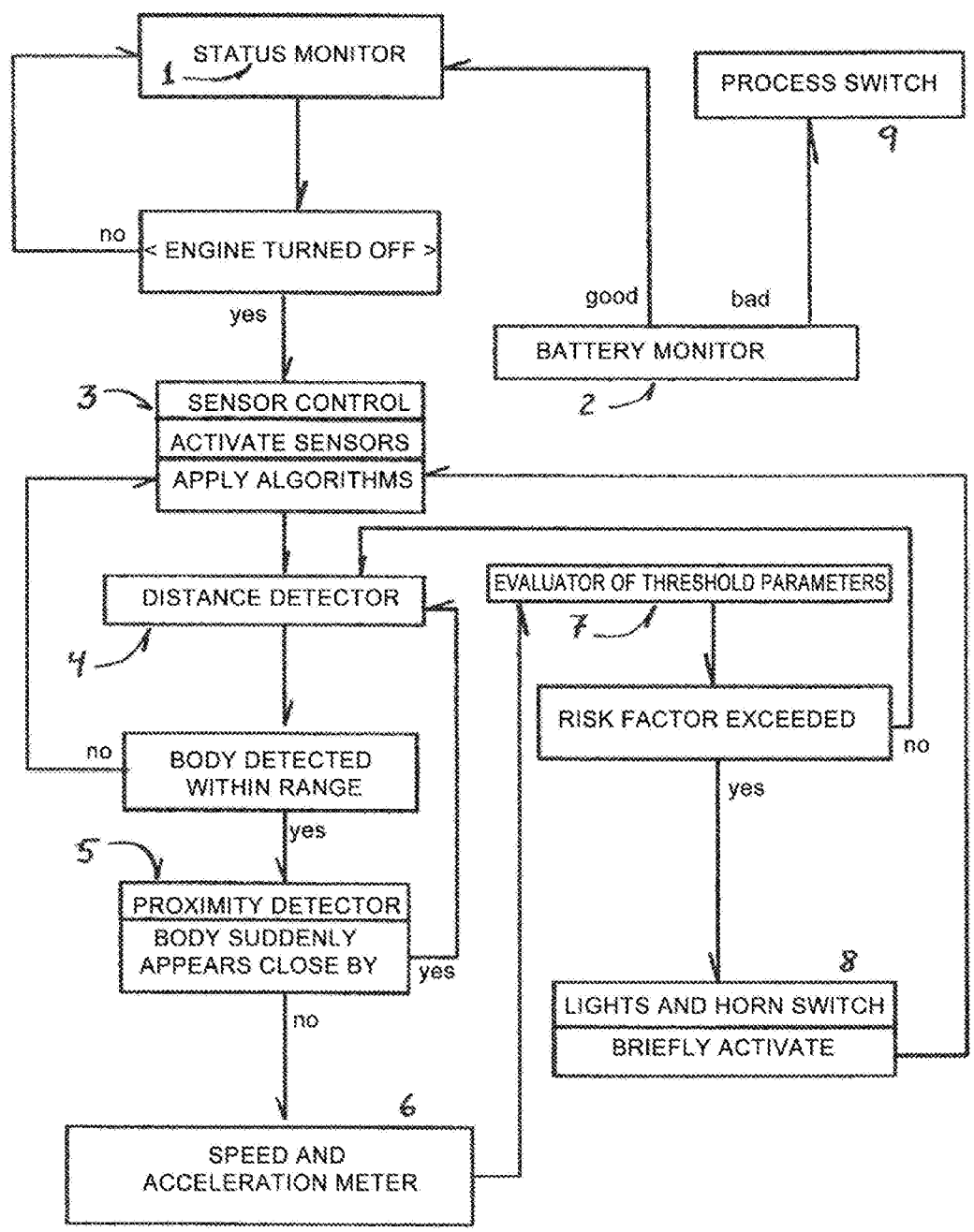
FIG. 1 shows the necessary real virtual devices and the integration thereof into the method and system for equipping the vehicle with an alarm against collisions when the vehicle is parked.

The basic elements of the system this method uses, system being understood as a series of elements or devices that combine their actions for a specific purpose, are illustrated in FIG. 1; a status monitor (1), which is an element that can determine in which state of operation the protected vehicle (20) is in, either running, or simply parked with the engine turned off, a battery monitor (2), which is an element that constantly monitors the level of the battery charge and if this level is too low, (which could be dangerous if the vehicle engine is subsequently started), it will be able to activate a process switch (9) which disables the operation of the alarm system for the parked car; a sensor control (3), which is an element that allows the ultrasonic or optical sensors of the vehicle to be activated or deactivated and can apply the necessary algorithms to the signals coming from the sensors to be able to interpret the values they emit; a distance detector (4), which determines when an object has entered an area that may constitute a danger for the protected vehicle (20), a proximity detector (5), which uses signals coming from the ultrasonic and optical sensors to determine if the approaching object is a pedestrian (29) that is crossing the area between vehicles (30), between the protected vehicle (20) and another parked vehicle (31), a speed and acceleration meter (6), which is an element that measures these parameters based on the signals coming from the sensors and an evaluator of threshold parameters (7), which determines when the parameters of speed, acceleration and distance exceed the admissible limits and, therefore, the approaching vehicle becomes a threat to collide with the parked vehicle, and lastly, a switch for lights and horns (8), which can be briefly activated to alert the approaching driver before a collision happens.

The alarm will only activate when the conditions of distance, acceleration and speed of the approaching vehicle constitute an actual risk and, therefore, we have created a value which we will call risk factor (RF), if the distance between the vehicles is quite far and the approach speed is low, the possibility of a collision is minimal, however, if the approach speed is high and the distance between the vehicles is short, the possibility of a collision is high, unless there is a strong deceleration, therefore, there is an range of speed, distance and acceleration which when combined gives us a danger zone, and other combinations will give us an low risk factor (RF). It is not desirable for the alarm to activate when a pedestrian (29) is walking and crosses in front or to the rear of the car, which usually happens when a person wants to cross the street between parked cars. In this case there exists what we call an instantaneous change of distance, given that an object suddenly enters in the field of view of the sensors, giving the idea that an object is at a very short distance and since it appeared suddenly, it may be considered that it has a very high speed and acceleration, however, in this case, the alarm must remain deactivated: this is achieved by implementing the following formula:

$$RF = (DF)(SF)(1+AF)(ICF)$$

Where (DF) is the impact factor of distance, (SF) is the impact factor of speed, (AF) is the impact factor of acceleration and (ICF) is the impact factor of instantaneous change of distance, which can only have two values, one or zero. This way if a person or animal crosses in a tangential way close to the front or rear part of the vehicle, although the sensors detect an very high approach speed, high acceleration and a minimal distance, the impact factor will be zero and, therefore, the risk factor RF will be zero, and as can be seen in FIG. 1, the horns and the lights will not be activated and will only continue to monitor the area to assess new events.

Figure 2:
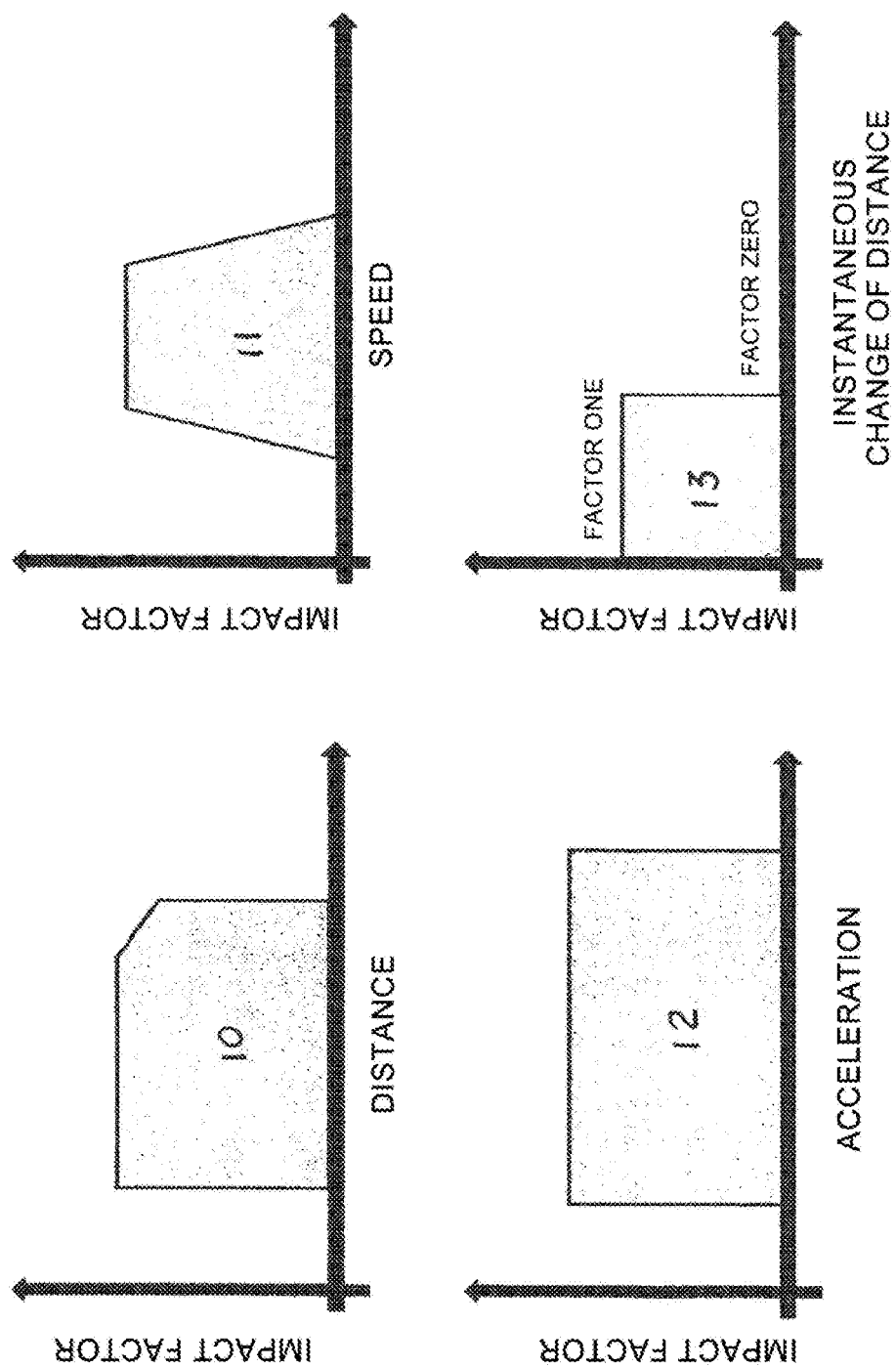
FIG. 2 shows the impact factors of distance, speed, acceleration and instantaneous change of distance, which are parameters that determine the actions to be executed based on a formula.

FIG. 2 shows the zone of influence of each impact factor, thus the impact factor of distance (10) determines that distances that are not extremely small or extremely large must be considered, the impact factor of speed (11) determines that for this parameter there is an area of action that increases as the speed increases and must decrease when the speeds are extremely high, which could indicate the case of a vehicle passing on the side at a high speed which is detected by one of the sensors, and something similar occurs with the impact factor of acceleration (12), while the impact factor of instantaneous change of distance (13) will only have two values, one or zero, and this indicator allows us to rule out the passing of a pedestrian, animal or cyclist, all of these factors having been determined in an empirical way.

FIG. 1 shows the interaction between each one of the elements or devices of the system, such that the vehicle will emit an alarm sound and briefly turn on the lights only when there is enough battery energy, when it is detected that the engine is turned off, when the sensors detect an object within the area of susceptibility, when it is determined that this object is not a pedestrian, animal or cyclist and when the risk factor (RF) exceeds the pre-established limit.

Figure 3:
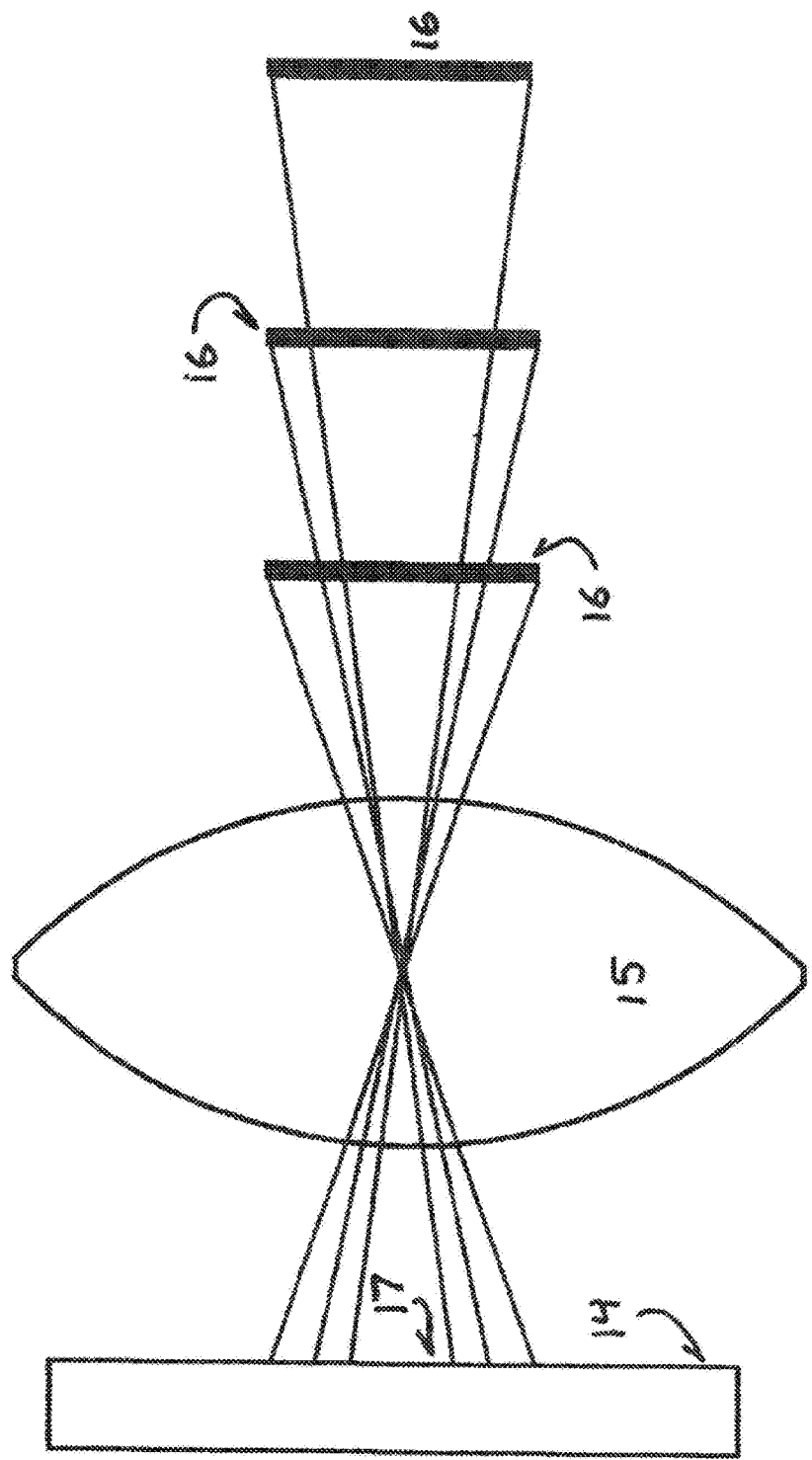
FIG. 3 shows how a camera can be used to determine the distance of an object to the same.
Figure 4:
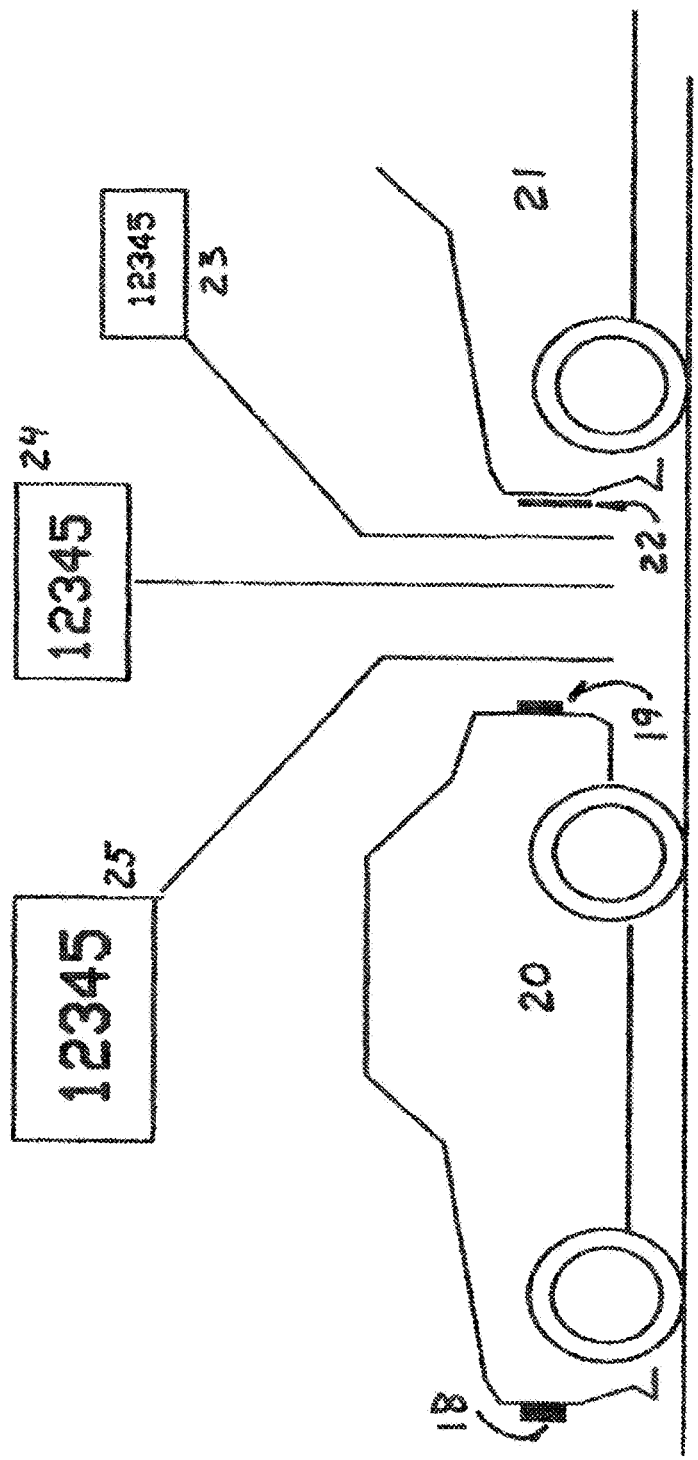
FIG. 4 shows how a camera is used to monitor the number plates of a vehicle that is approaching and thereby establish the relative speed and distance thereof.

In some cases, some vehicles are not manufactured to be equipped with ultrasonic sensors on the bumpers, but do have cameras, mainly on the rear part, and moreover, there are electronic cameras with very small dimensions that have a significantly reduced cost, and which can easily be placed on the guard or bumper and be incorporated into the control of the central computer, either by Bluetooth, Wi-Fi, or other wired or wireless connections. These cameras are able to be used as substitutes for the ultrasonic sensors for this application, since we will establish a method for converting these cameras into distance, speed and acceleration sensors. FIG. 3 shows how some elements of a camera, such as the image detector (14) and the lens (15) can generate an image (17) of an object (16) observed and how, as this object approaches or moves away from the image detector (14), the image (17) will be perceived as larger or smaller, larger the closer it gets and smaller the farther away it moves. This does not allow us to determine the distance and speed of an object if we do not know the exact dimensions of the same, but in this application, there is an object, the dimension of which we can know precisely, and this object is the registration number plate of the automobile, especially if we take the height of the plate as a reference, because the plate itself can be mounted in plate frames which vary the apparent dimensions thereof, however the numbers and letters always have the same dimensions. FIG. 4 shows how a protected vehicle (20) equipped with a front camera (18) and a rear camera (19) can use this camera to establish how far away the number plate (22) of the approaching vehicle (21) is, and the image of the camera will perceive the size if the numbers of the number plate such that they will be larger as the cars become closer to one another, thus the image of the number plate at a large distance (23) will be less than the image of the number plate at a medium distance (24) and this in turn will be less than the image of the number plate at a short distance (25).

Figure 5:
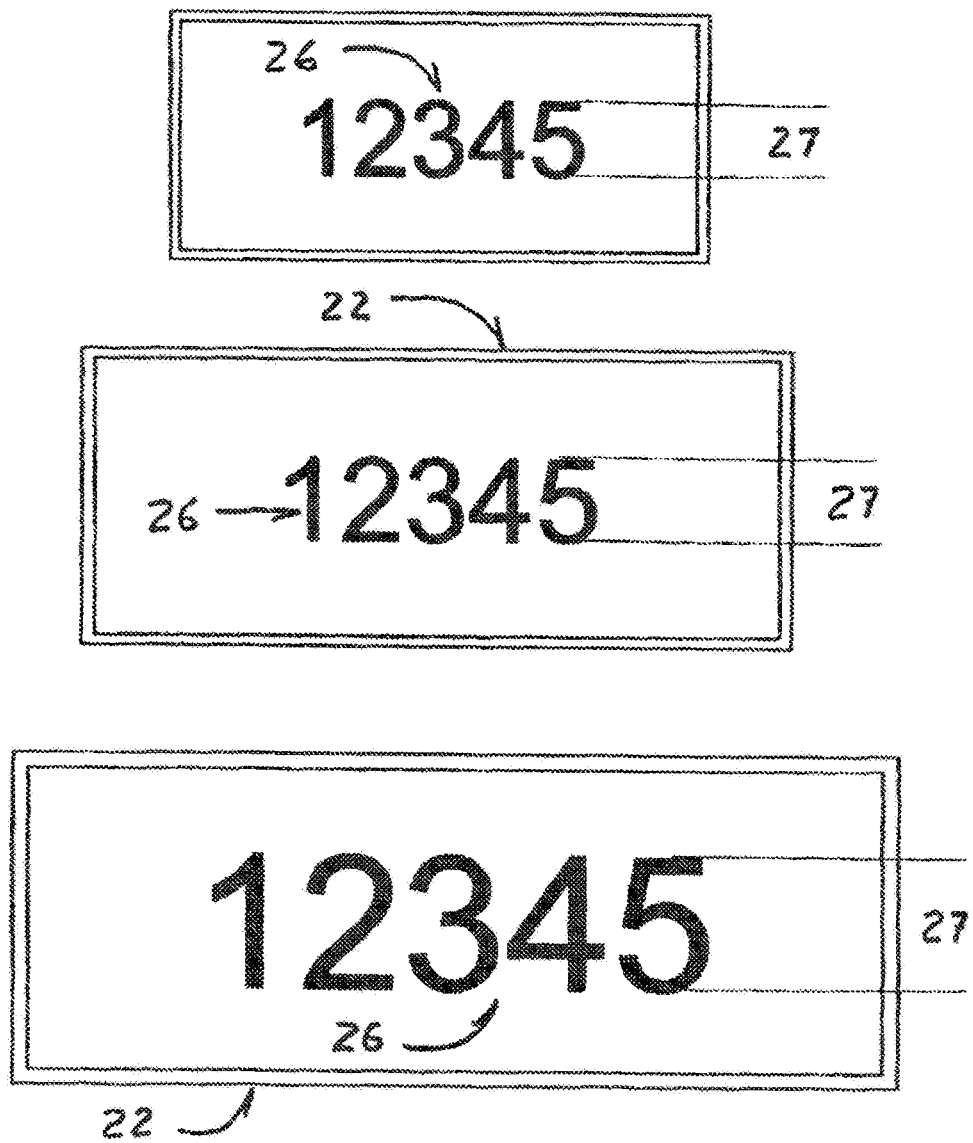
FIG. 5 shows how the camera captures the dimensions of the number plate of a car at different distances.
Figure 6:
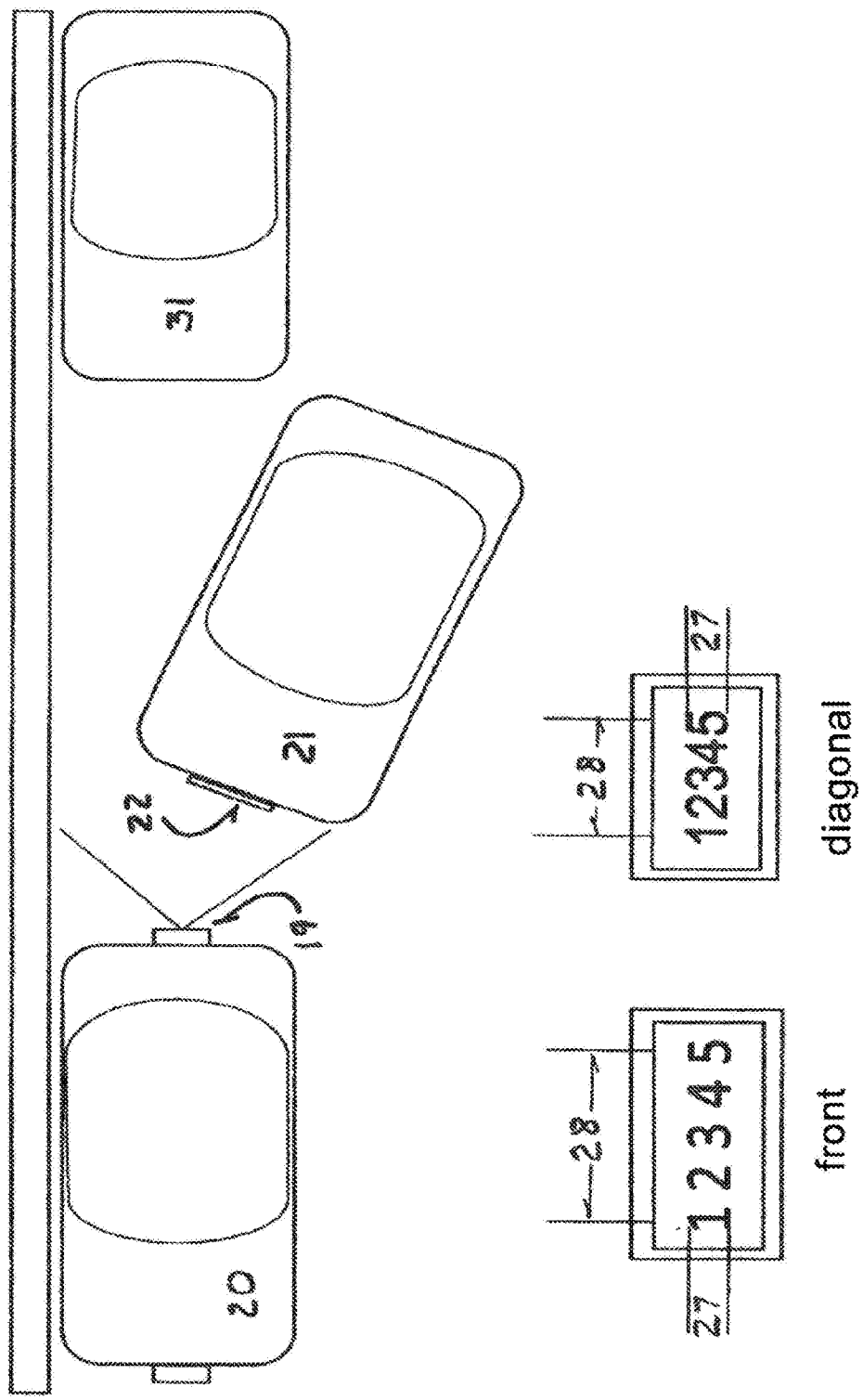
FIG. 6 shows the way the approach angle cannot affect the determination of the distance between a vehicle that is approaching and the parked vehicle.

FIG. 5 shows how the numbers (26) of the number plate (22) will be seen bigger and bigger as the vehicles become closer, and for our purposes we will only use the height of the numbers of the number plate as a reference, in other words, their vertical size, this being due to the fact that, as can be seen in FIG. 6, if a vehicle approaches in a diagonal way, the width of the numbers (28) can be seen as shorter, however, if the vehicle approaches in an collinear way, the perceived height of the numbers (27) does not vary, the number plate (22) being at the same distance from the rear camera (19), regardless of whether the vehicles (20) and (21) are collinear or diagonal.

FIG. 7 shows a pedestrian (29) crossing through an area between vehicles (30) and in this case, unlike when ultrasonic sensors are used, the rear camera (19) can easily differentiate between a vehicle and a person, simply because the person does not have a number plate and, thus, they will not be bothered by the alarm.

An additional advantage to the use of cameras is that by means of a photograph, the number plate of the vehicle that impacts the protected parked vehicle when the impacting vehicle ignores the warnings of the parked vehicle can be registered and the information can be transmitted by mechanisms of the internet of things (IoT) or stored in a memory for subsequent use by means of the central computer, adding data with regard to the time and place in which the collision took place. The connection between the cameras and the central computer and the respective operative elements which, for this purpose, are configured in the central computer can be wired or wireless.

The process for being able to determine the distance from the number plate to the camera is therefore done by measuring the height of the numbers of the registered number plate on the image detector (14), and due to the fact that all of the number plates have numbers with equal heights, it is easy to establish the relationship between the height perceived of the numbers (27) of the number plate and the distance between the number plate and the camera, and by subsequently measuring the variation of this height with respect to the time, the speed of the approach can be determined, and measuring the variation in this speed with respect to the time, the acceleration is obtained, which instantly gives us the required parameters, and taking the first and second derivative with respect to the time of the function which defines the distance between the number plate and the camera with respect to the time based on the perceived height of the numbers (27) of the number plate, the variation values are obtained as a continuous function, these data being used to feed the speed and acceleration meter (6) and the distance detector (4) for the corresponding processing thereof according to the method and system described in diagram 1.

The invention claimed is:

1. A method for providing protection against impacts to a vehicle when parked, wherein the vehicle comprises a central computer that comprises a status monitor, a sensor control, a distance detector, a proximity detector, a speed and acceleration meter, an evaluator of threshold parameters, a light and horn switch, a battery monitor and a process switch, as well as sensors placed on front and rear parts of the vehicle, and a data file that defines data integrated into a reference frame and an equation applied to determine how dangerous an approach maneuver is at a given moment, and, upon determining the reference frame is exceeded, activating a light and horn via a switch.

2. The method according to claim 1, wherein the sensors comprise ultrasonic sensors installed on bumpers or guards of the vehicle.

3. The method according to claim 1 wherein the sensors comprise an electronic camera placed on the rear part of the vehicle and another placed on the front part and which are connected to the central computer in a wired or wireless fashion to provide the central computer with information on number plates of vehicles that approach the vehicle.

4. The method according to claim 1, wherein the sensors comprise electronic cameras used as distance sensors and which, in the case of a collision with the vehicle, obtain a photograph of a number plate of an impacting vehicle.

5. The method according to claim 1, wherein the data file defines combinations of permissible acceleration, distance and speed, which are not considered risky.

6. A system for providing protection against impacts to a vehicle when parked, the system comprising a status monitor, a sensor control, a distance detector, a proximity detector, a speed and acceleration meter, an evaluator of threshold parameters, a light and horn switch, a battery monitor and a process switch, sensors placed on front and rear parts of the vehicle, and a data file that defines data integrated into a reference frame and an equation applied to determine how dangerous an approach maneuver is at a given moment, and, upon determining the reference frame is exceeded, activating a light and horn via a switch.

7. The system according to claim 6, wherein the sensors comprise ultrasonic sensors installed on bumpers or guards of the vehicle and which are connected to the sensor control of the central computer.

8. The system according to claim 6 wherein the sensors comprise an electronic camera placed on the rear part of the vehicle and another placed on the front part and which are connected to the central computer in a wired or wireless fashion to provide the central computer with information on numbers of the number plates of the vehicles that approach the vehicle.

9. The system according to claim 6, wherein the sensors comprise electronic cameras used as distance sensors and which, in the case of a collision with the vehicle, obtain a photograph of a number plate of an impacting vehicle.

10. The system according to claim 6, wherein the data file defines combinations of permissible acceleration, distance and speed, which are not considered risky.

* * * * *